United States Patent

[11] 3,584,142

[72] Inventor Max S. Schoeffler
Madison Township, Middlesex County, N.J.
[21] Appl. No. 783,561
[22] Filed Dec. 13, 1968
[45] Patented June 8, 1971
[73] Assignee Bell Telephone Laboratories, Incorporated
Murray Hill, Berkeley Heights, N.J.

[54] INTERACTIVE COMPUTER GRAPHICS USING VIDEO TELEPHONE
1 Claim, 1 Drawing Fig.

[52] U.S. Cl. .......... 178/6.8, 340/172.5, 340/324.1
[51] Int. Cl. .......... H04n 7/18
[50] Field of Search .......... 178/6 F, 6 M, 6.8, 18, 19; 340/324.1, 146.3, 172.5; 235/198, 151.11

[56] References Cited

UNITED STATES PATENTS

| | | | |
|---|---|---|---|
| 2,986,596 | 5/1961 | Hammond, Jr. .......... | 178/6.8X |
| 3,347,981 | 10/1967 | Kagan et al. .......... | 178/5 |
| 3,399,401 | 8/1968 | Ellis et al. .......... | 340/324 |
| 3,453,384 | 7/1969 | Donner et al. .......... | 178/6.8 |

*Primary Examiner*—Robert L. Griffin
*Assistant Examiner*—Richard K. Eckert, Jr.
*Attorneys*—R. J. Guenther and E. W. Adams, Jr.

ABSTRACT: This disclosure relates to a simple method for a video telephone subscriber to interact with a remote time-shared computer in a typical computer graphics mode. The video camera image of a pencil beam of light, pointed in the area of view of the camera, is transmitted to a remote computer. The coordinates of the light spot are computed and an indicator marker, having corresponding coordinates, is then transmitted from the computer back to the video telephone set along with a predetermined graphics display. The user can thus, by moving the pencil beam, position the marker to a desired location on the video display screen and then signal the computer to read the marker location and take appropriate action.

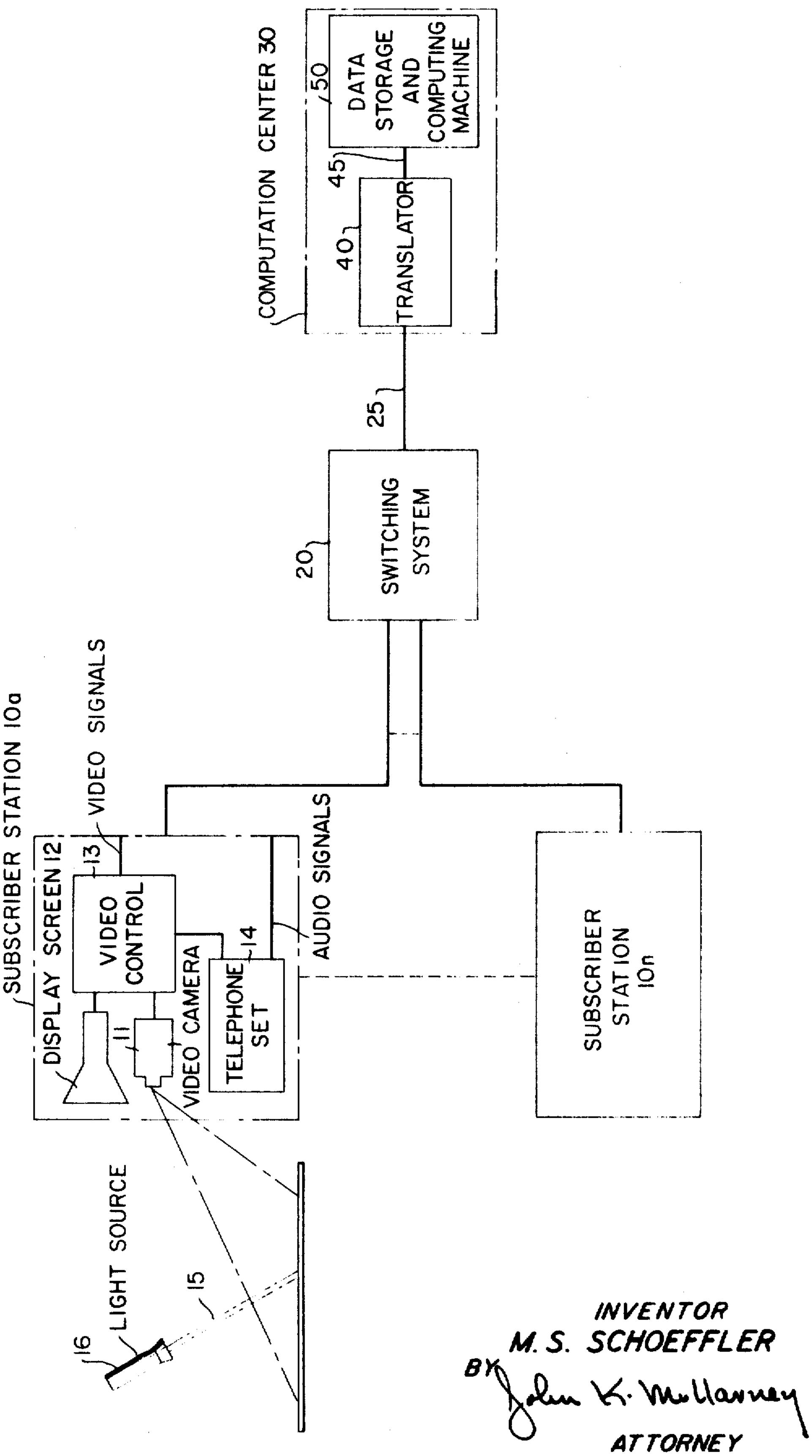
INVENTOR
M. S. SCHOEFFLER
BY John K. McHarney
ATTORNEY

INTERACTIVE COMPUTER GRAPHICS USING VIDEO TELEPHONE

BACKGROUND OF THE INVENTION

This invention relates to an interactive computer graphics problem-solving process utilizing a video telephone network.

The use of computers to solve a wide variety of problems, scientific and otherwise, is growing rapidly. The major reason for this increased usage is the continuing development of easier ways for man to define problems for, and receive answers from, computers. One of the most exciting new developments is the ability of man to communicate with computers directly via pictures or graphs. Communicating with computers by means of pictorial images is called "computer graphics."

It has long been realized that pictures or graphs convey information much better than tables of symbols and numbers. On output, graphs and drawings convey meaning to a human viewer much faster, and generally more accurately, than large tables of symbols and numbers. On input, the ability to identify objects in a picture by pointing at them, or to modify or amend a picture by pointing at the objects and/or picture-related functional words, is a great convenience. The combination of graphical input and output is called "interactive computer graphics."

The implications of this computer communication entirely in pictorial terms are far-reaching. Because such an interface is quite human-oriented and easily learned, people without computer training can easily and intelligently use computers in their everyday work.

The development of video telephone communication has proceeded in the same time frame as computer graphics. Accordingly, as might be expected, there has been increasing interest in the possible use of video telephone terminals in conjunction with graphics-programmed, possibly time-shared, computer systems.

There appear to be two prime requirements which must be dealt with prior to any extensive utilization of a combined video telephone-computer system such as that noted above. First, such an arrangement must be simple to use. Since video telephone sets will be in the hands of large numbers of people of varying technical backgrounds, the need for simplicity is evident. Second, the arrangement must be inexpensive particularly in terms of station equipment. In view of the large number of video telephone station sets which are envisioned, any proposal which requires extensive station set modification is economically infeasible.

SUMMARY OF THE INVENTION

Accordingly, it is an object of the invention to provide a method whereby video telephone subscribers can interact with a remote time-shared computer in a typical interactive computer graphics mode.

It is a further object of the invention to provide a method which permits video telephone users to operate in an interactive computer graphics mode without modification of the station set.

In a method in accordance with the invention, the camera of a video telephone set is aimed (in the document or graphics mode) at a blank surface such as a dark desk top and the user directs a beam of light in the area of view of the camera. The camera image, which includes that of the light beam, is then transmitted to a remote computer which computes the $x$ and $y$ coordinates of the latter based on the location of the light spot in the total image scene. A marker, having appropriate picture coordinates, is transmitted from the computer back to the video telephone set along with a predetermined graphics display. Both are then shown on the display screen of the video telephone set. When the light beam is moved, a corresponding translation of the marker is computed and displayed on the screen. The user can thus, by moving the light beam, position the marker to a desired location on the video display screen and then signal the computer (by keying a preselected code signal) to read the location of the marker and take appropriate action. Operation thus proceeds in the typical interactive graphics manner.

BRIEF DESCRIPTION OF THE DRAWING

A complete understanding of the present invention and of the above and other objects and advantages thereof may be gained from a consideration of the following detailed description when the same is read in conjunction with the accompanying drawing which shows a video communication and computer system useful in carrying out the principles of the invention.

DETAILED DESCRIPTION

Referring now to the drawing, there is shown a number of subscriber stations $10_a$–$10_n$ each connected to a switching system 20 which, in turn, is connected to a computation center or office 30 via an interoffice trunk 25. Each subscriber station comprises a video telephone set which includes a video camera 11, a cathode ray tube display screen 12, video control circuitry 13 and a telephone set 14 preferably of the type that generates multifrequency tone signals. Video telephone sets such as that described are in use and have been extensively described in the literature; for an introductory explanation of the basic set see *The Bell Laboratories Record*, Vol. 42, No. 4, Apr. 1964, pages 114—120; this early model has now been modified to include "zooming" and "graphics mode" features—see *The Bell Laboratories Record*, Vol. 45, No. 11, Dec. 1967, pages 374—376. The multifrequency telephone signaling set may advantageously comprise a set such as that described in the *I.E.E.E. Transactions on Communications and Electronics*, Mar. 1963, pages 9—14.

Each subscriber may initiate a connection with any other subscriber by simply "dialing" or keying an appropriate code on the multifrequency telephone set 14. This keying causes the generation of switching signals which are transmitted to the switching system 20, at a remote central office, where they are processed. Switching systems, both of the space-division and time-division variety, have been so extensively described in the patent and technical literature as to obviate further description or citation herein. The switching system 20 after processing the switching signals, establishes a video connection between the initiating subscribed station and the station specified by the keyed code. After the connection is established, the two subscribers may communicate with each other visually as well as orally as described in The Bell Laboratories Record references, supra.

Each subscriber may also establish a connection between his station and the remote computation office or center 30 for either information retrieval or computational services. Such a connection is likewise established by keying an appropriate code on the telephone set 14. The switching signals generated thereby are processed by the switching system 20 which establishes a connection between the initiating station and the data storage and computing machine 50 via the interoffice trunk 25 and translator 40. The primary function performed by translator 40 is the conversion of incoming video to the digital format required by the computing machine and, of course, the converse—i.e., conversion of the digital data output from the computer to the video signal format required by the display device. Other ancillary functions of translator 40 comprise multifrequency to digital signal conversion and data buffering. This interface translation operation is frequently encountered in the art and it has been extensively described in the literature; see *I.E.E.E. Transactions on Communication Technology*, Vol. Com-15, No. 6, Dec. 1967, pages 812—824. The translator 40 is connected to the data storage and computing machine 50 via an intraoffice trunk 45; the computing machine may comprise any general purpose computer, e.g., the IBM 360–40 or GE 645 computer.

Interactive computer graphic applications require the use of a central computer with data communication capability, a large amount of high-speed primary storage, and fast secondary storage in the form of magnetic disc or drum for program and data files. Computer time is often shared; time-sharing techniques make it economically feasible for interactive computer graphic programs to remain in the computer for relatively lengthy periods without shutting out other users. In this regard, it should be noted that the typical CRT graphic display can be maintained without consuming costly central machine resources, since a special high-speed disc buffer is generally used to store the commands that generate the picture. A track of this disc has to be loaded only once for each picture or graphic display to be shown.

Various graphical programming languages have been designed for interactive computer graphics problem-solving processes. A typical one, GRIN-2 (GRaphical INteraction), is briefly described in Section V, of the article "Multi-Function Graphics for a Large Computer System" by C. Christensen et al., American Federation of Information Processing Societies (AFIPS) Conference Proceedings, 1967 Fall Joint Computer Conference, Vol. 31. It should be understood, however, that the invention is in no way limited to the above or any other graphical programming language, and any one of a number of appropriate languages may be utilized to advantage herein.

Now to initiate computer interaction, the user at a subscriber station keys the appropriate code to establish a connection to the remote computer via the switching system 20. The computer programs are then readied for execution and, typically, the computer then asks for the user's number; this query is preferably made by the display of a statement such as "GIVE USER NO." or the equivalent on display screen 12. The user number is needed to determine if the use to be made of the computer is authorized, it is needed for billing purposes, et cetera.

In response to the keying of an authorized user number, a dictionary of the available programs is delivered by the computer for visual presentation on display screen 12. With this presentation, the subscriber then proceeds to interact with the computer in a manner in accordance with the present invention.

For interactive computer graphics operation, the video camera 11 is set to the document or graphics mode. A built-in mirror automatically swings to a 45° angle in front of the lens when this mode is chosen. The video camera is thus aimed at the desk top in front of the video telephone set, as shown in the drawing. The area of view of the camera should be clear of papers and the like and, for contrast, preferably dark–no special effort need be made, however, in this latter regard. The user then directs a beam of light 15–preferably a narrow pencil beam, in the area of view of the camera. The light source 16 can be a simple penlight. The camera image which, of course, includes that of the light beam, is transmitted to the computing machine 50. The computer then computes the $x$ and $y$ coordinates of the position of the light spot in the total image scene. The computer is not necessarily limited to Cartesian coordinate computation; it is, however, the most expedient. A marker, having corresponding $x$ and $y$ picture coordinates, is then generated and transmitted from the computer back to the video telephone set along with a predetermined graphics display. Initially this display is, of course, the aforementioned dictionary of available programs in store. The marker generated at the computer can be of any predetermined configuration such as a small round spot or dot, a circle, an arrow, et cetera. Because the marker is generated at the computer it can be relatively "clean" or sharp in contrast to the light spot of the pencil beam which will be somewhat diffuse. The marker and the graphics display are displayed on the viewing screen 12. By moving the light source 16 the user thus, in effect, moves the marker on the display screen to wherever he wishes. When the user is satisfied with having located the marker at the proper position on the display screen, he signals the computer to that effect by sending a "mark" signal to the remote computer. This mark signal can be a preselected code signal that is keyed on the telephone set 14.

Initially a dictionary of the available programs is visually presented on display screen 12. The user moves the light source 16, which is directed in the field of view of the camera 11, until the resultant marker displayed on screen 12 is properly positioned adjacent the desired graphics program in the dictionary listing. The user then signals the computer to this effect by sending the appropriate mark signal. The computer, having generated the indicator marker, can calculate the portion of the picture being pointed to and can use this information as control data. The mark signal thus instructs the computer to read the location of the marker and take appropriate action. In effect, the computer identifies which data is spatially coincident with the displayed marker when the mark signal is received. The designated program is then read into temporary store and the selected interactive graphics routine is initiated under program control. As succeeding graphic displays of the interactive graphics routine are generated, the user positions the marker, in each case, to a desired location on the display and then signals the computer to read the location and take the next appropriate step or action in the programmed procedure. Operation thus proceeds in a typical interactive computer graphics mode.

The method in accordance with the present invention can be utilized in carrying out any of the known interactive computer graphics problem-solving programs. Its use in information retrieval, inventory control and parts ordering processes will also be obvious to those in the art. In the June 1968 issue of *The Bell Laboratories Record* two articles by W. H. Ninke and P. S. Kopel, respectively, include brief descriptions of how interactive computer graphics is utilized in data analysis (page 185) and circuit design (pages 194—5). The interactive graphics arrangement of these articles requires a small, local, dedicated computer and it utilizes a stylus device called a "light pen" which is electrically connected to the local computer. However, while the physical setup and the mode of operation are different, the problem-solving procedures noted therein can be carried out in an analogous manner in accordance with the method of the present invention.

As should be understood at this point, the present invention is in no way limited to any specific apparatus implementation. For example, transmission can be carried out on a space separated, frequency separated or time separated basis; the switching system can comprise a space division switch or a time division one; a data communications service set can be utilized for signaling in place of the multifrequency telephone set; any general purpose computer can be advantageously utilized, et cetera.

As will be evident, any high contrast spot disposed in the field of view of the camera can be used in place of the light spot heretofore described. For example, a pointer having a bright, preferably white tip will be readily discernible in a dark surround and hence can be equally utilized to advantage in accordance with the invention.

Accordingly it is to be understood that the foregoing description is merely illustrative of the principles of the present invention and various modifications thereof may be devised by those skilled in the art without departing from the spirit and scope of the invention.

I claim:

1. An interactive computer graphics problem-solving process comprising the steps of directing a beam of light in the area of view of the camera of a video telephone set whose camera is effectively aimed at a blank horizontal surface immediately in front of the video set, transmitting the camera image via a telephone transmission and switching network to a remote time shared data storage and computing machine, determining at the remote computer location the picture coordinates or the light beam image, transmitting a marker having corresponding picture coordinates from the remote location back via said telephone network to the video telephone set along with a preselected graphics display, displaying the marker and said graphics display on the viewing screen of said video telephone set, the movement of said light beam in the area of view of the camera thus serving to cause a corresponding movement of the marker on said viewing screen, signaling the remote computing machine by means of a multifrequency tone signal to note the location of the marker when the same is positioned to a desired location with respect to the visual graphics display and to take a predetermined programmed action, and repeating the above-recited steps as successive graphic displays of a selected interactive graphics routine are successively developed and displayed on the viewing screen of said video telephone set.